(12) United States Patent
Morrill (10) Patent No.: US 8,243,961 B1
(45) Date of Patent: Aug. 14, 2012

(54) CONTROLLING MICROPHONES AND SPEAKERS OF A COMPUTING DEVICE

(75) Inventor: Daniel Lawrence Morrill, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,552

(22) Filed: Sep. 30, 2011

Related U.S. Application Data (63) Continuation of application No. 13/169,949, filed on Jun. 27, 2011.

(51) Int. Cl.
*H02B 1/00* (2006.01)
*G05B 11/01* (2006.01)
*H04M 1/00* (2006.01)
*H04M 9/00* (2006.01)

(52) U.S. Cl. ............... 381/123; 379/433.03; 455/575.1; 700/13

(58) Field of Classification Search ............. 381/59–59, 381/91, 332–335, 123; 455/550.1, 566, 569.1, 455/575.1–575.4; 700/12–13, 94; 379/388.01–388.06, 433.02–433.03, 432
See application file for complete search history.

(56) References Cited

U.S. PATENT DOCUMENTS

| | | | |
|---|---|---|---|
| 5,787,183 A | 7/1998 | Chu et al. | |
| 7,035,416 B2 | 4/2006 | Matsuo | |
| 7,145,835 B2 | 12/2006 | Pope | |
| 7,146,014 B2 | 12/2006 | Hannah | |
| 2006/0135085 A1 | 6/2006 | Chen | |
| 2008/0117094 A1 | 5/2008 | Lindoff et al. | |
| 2008/0146289 A1* | 6/2008 | Korneluk et al. | 455/569.1 |
| 2009/0220065 A1 | 9/2009 | Ahuja et al. | |
| 2010/0008523 A1* | 1/2010 | Demuynck et al. | 381/182 |
| 2011/0002487 A1 | 1/2011 | Panther et al. | |
| 2011/0044478 A1* | 2/2011 | Qu | 381/123 |
| 2011/0216093 A1* | 9/2011 | Griffin | 381/122 |
| 2012/0077480 A1* | 3/2012 | DeLuca | 455/418 |

OTHER PUBLICATIONS

Product information brochure: Wolfson® Microelectronics, Smartphone Designs using WM8994, retrieved on Feb. 2, 2011 from http://www.eetkorea.com/STATIC/PDF/200908/EEKOL_2009AUG28_ACC_DSP_NT_88.pdf.
Sprint User Guide, HTC Touch Pro2, copyright 2009, 234 pp.
HTC Touch Pro2—Review:The Benchmark Smartphone (1/4), dated Jun. 1, 2009, 10 pp., retrieved from http://pocketnow.com/review/htc-touch-pro2.
Polaroid Sx-70 Sonar One step-1978, retrieved at http://basepath.com/Photography/PolaroidSX70.php on Jun. Feb. 8, 2011, 4 pp.
U.S. Appl. No. 13/169,949, by Daniel Lawrence Morrill, filed Jun. 27, 2011.

* cited by examiner

*Primary Examiner* — Jesse Elbin
(74) *Attorney, Agent, or Firm* — Shumaker & Sieffert, P.A.

(57) ABSTRACT

Various aspects of this disclosure are directed to determining an orientation of a mobile computing device. The mobile computing device may include a first microphone-speaker system and a second microphone-speaker system that can each provide microphone and speaker capabilities. The first microphone-speaker system may be enabled to operate as a speaker device. The enabling of the first microphone-speaker system may include allowing the first microphone-speaker system to provide audio output and disallowing the mobile computing device to process audio input received from the first microphone-speaker system. The second microphone-speaker system may be enabled to operate as a microphone. Enabling the second microphone-speaker system may include allowing the mobile computing device to process audio input received from the second microphone-speaker system and disallowing the second microphone-speaker system to provide audio output. Enabling of the first and second microphone-speaker systems may be responsive to and based on the determined orientation.

18 Claims, 4 Drawing Sheets

CONTROLLING MICROPHONES AND SPEAKERS OF A COMPUTING DEVICE

This application is a continuation of U.S. application Ser. No. 13/169,949, filed Jun. 27, 2011, the entire content of which is incorporated herein by reference.

TECHNICAL FIELD

This disclosure relates to computing devices and, more particularly to, computing devices having speakers and microphones.

BACKGROUND

Devices such as mobile devices perform various functions. For example, such devices may be used as communications devices for telephonic communications, may display image content such as documents, e-mails, and pictures on a screen, and may download information and applications from the Internet. In some examples, mobile devices may have a speaker and a microphone for use as a mobile communications device, such as a cellular telephone.

SUMMARY

In one example, various aspects of this disclosure are directed to a method comprising determining, by a mobile computing device, an orientation of the mobile computing device, wherein the mobile computing device comprises a first microphone-speaker system and a second microphone-speaker system that can each provide microphone and speaker capabilities. The method further comprises enabling, by the mobile computing device, the first microphone-speaker system to operate as a speaker device responsive to and based on the determined orientation, wherein enabling the first microphone-speaker system allows the first microphone-speaker system to provide audio output and disallows the mobile computing device to process audio received from the first microphone-speaker system. The method further comprises enabling, by the mobile computing device, the second microphone-speaker system to operate as a microphone responsive to and based on the determined orientation, wherein enabling the second microphone-speaker system to operate as a microphone allows the mobile computing device to process audio input received from the second microphone-speaker system, and disallows the second microphone-speaker system to provide audio output.

In another example, various aspects of this disclosure are directed to a computer-readable storage medium comprising instructions that, when executed, cause one or more processors of a mobile computing device to perform operations comprising determining an orientation of the mobile computing device, wherein the mobile computing device comprises a first microphone-speaker system and a second microphone-speaker system that each provide microphone and speaker capabilities. The computer-readable storage medium further comprises instructions that, when executed, cause the one or more processors of the mobile computing device to perform operations comprising enabling the first microphone-speaker system to operate as a speaker device responsive to and based on the determined orientation, wherein the instructions to enable the first microphone-speaker system to operate as a speaker device allow the first microphone-speaker system to provide audio output and disallow the mobile computing device to process audio input received from the first microphone-speaker system. The computer-readable storage medium further comprises instructions that, when executed, cause the one or more processors of the mobile computing device to perform operations comprising enabling the second microphone-speaker system to operate as a microphone responsive to and based on the determined orientation, wherein the instructions to enable the second microphone-speaker system to operate as a microphone allow the mobile computing device to process audio input received from the second microphone-speaker system and disallow the second microphone-speaker system to provide audio output.

In another example, various aspects of this disclosure are directed to a mobile computing device comprising a first microphone-speaker system and a second microphone-speaker system that can each provide microphone and speaker capabilities, at least one processor, a module operable by the at least one processor to determine an orientation of the mobile computing device, and means for enabling the first microphone-speaker system to operate as a speaker device and enabling the second microphone-speaker system to operate as a microphone responsive to and based on the determined orientation, wherein enabling the first microphone-speaker system to operate as a speaker device allows the first microphone-speaker system to provide audio output and disallows the mobile computing device to process audio input received from the first microphone-speaker system, and wherein enabling the second microphone-speaker system to operate as a microphone allows the mobile computing device to process audio input received from the second microphone-speaker system and disallows the second microphone-speaker system to provide audio output.

Various aspects of this disclosure may provide one or more advantages. For instance, one or more aspects of this disclosure may allow a user to pick up a mobile computing device and use it as a telephone in multiple orientations. As one example, a user of the mobile computing device may not need to look at the device or manipulate it to ascertain the correct orientation for use. The user may be able to simply pick up the device such that one end is near the user's ear and another end is near the user's mouth to use the device as a telephone. As another example, aspects of this disclosure may allow the mobile computing device to be designed symmetrically (e.g., without tactile notches, grooves, or buttons on the device to help a user determine the orientation of the device through touch). As such, aspects of this disclosure may allow a mobile computing device to be designed in a more aesthetically pleasing way.

The details of one or more aspects of this disclosure are set forth in the accompanying drawings and the description below. Other features, objects, and advantages of the disclosure will be apparent from the description and drawings, and from the claims.

DETAILED DESCRIPTION

Conventionally, mobile computing devices, such as cellular telephones, require a particular orientation of the device for use as a telephone. For example, the conventional placement of a speaker at one end of the device and a microphone at the opposite end requires the user to hold the speaker to an ear while holding the microphone near the mouth. However, many users carry such devices in places where the orientation of the device can change or be forgotten, such as in a bag or a pocket. When the device rings, the user may have to look at the device or manipulate it to ascertain the correct orientation for use. A user who simply places the device to an ear without first determining the correct orientation has only a fifty percent chance that the device is in the correct orientation for use. In an effort to alleviate this problem, many devices are designed asymmetrically or with tactile notches, grooves, or buttons on the device to help a user determine the orientation of the device through touch. However, such asymmetries or additions to the device can be aesthetically unpleasing. Moreover, even a user who is able to determine the orientation of the device through the use of those techniques may still have to manipulate the device to place it in the correct orientation for use.

Figure 1:
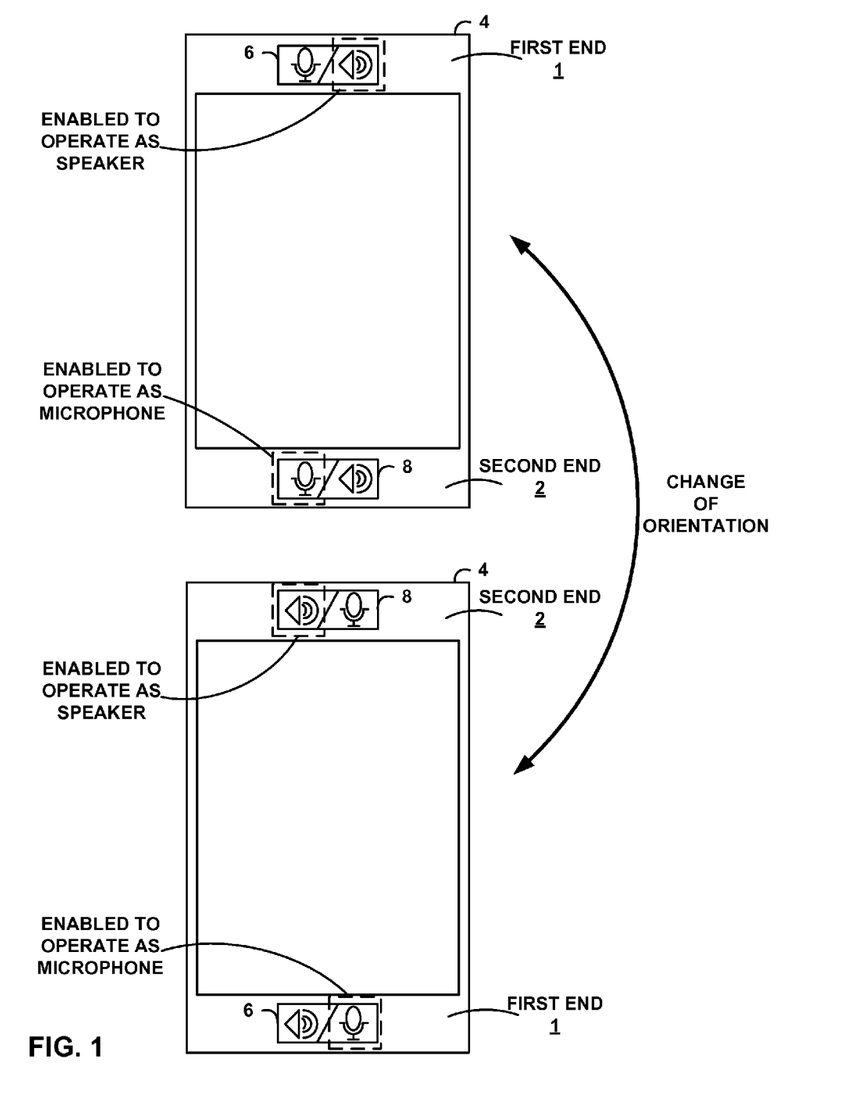
FIG. 1 illustrates an example mobile computing device.

FIG. 1 illustrates an example mobile computing device. As illustrated in FIG. 1, mobile computing device 4 may include a first end 1 and a second end 2. The first end 1 may be substantially opposite the second end 2. In some examples, the mobile computing device 4 may include a first microphone-speaker system that can be enabled to operate as either a microphone or as a speaker device, and a second microphone-speaker system that can be enabled to operate as either a microphone or as a speaker device. For instance, as in the example of FIG. 1, the mobile computing device 4 may include a first microphone-speaker system 6 and a second microphone-speaker system 8.

In some examples, the first microphone-speaker system 6 may comprise one hardware device. For example, the first microphone-speaker system 6 may be a microphone that can also function as a speaker device. In such an example, the first microphone-speaker system 6 may be enabled to operate as a speaker device when current is applied by the mobile computing device 4 to the first microphone-speaker system 6 in a particular direction. Similarly, the first microphone-speaker system 6 may be enabled to operate as a microphone when current is applied by the mobile computing device 4 to the first microphone-speaker system 6 in the opposite direction. As a result, the mobile computing device 4 may enable the first microphone-speaker system 6 to operate as a microphone or a speaker device.

In certain examples, the first microphone-speaker system 6 may include both a speaker device and a microphone that is separate from the speaker device. In these examples, the speaker device and the microphone of the first microphone-speaker system 6 may comprise physically distinct hardware devices that are each independently controlled by the mobile computing device 4. In these examples, the mobile computing device 4 may enable the first microphone-speaker system 6 to operate as a microphone or a speaker device by enabling either the microphone or the speaker device and disabling the other.

The second microphone-speaker system 8 may, in some examples, be substantially the same as the first microphone-speaker system 6. For example, the second microphone-speaker system 8 may be one hardware device or may include a speaker device and a physically separate microphone.

In some examples, the first microphone-speaker system 6 and the second microphone-speaker system 8 may be substantially equivalent in physical size. In certain examples, the first microphone-speaker system 6 and the second microphone-speaker system 8 may be substantially equivalent in audio input sensitivity. The sensitivity may be expressed as the electrical voltage (e.g., in millivolts) output by the microphone-speaker system configured to operate as a microphone in response to a particular sound pressure input (e.g., in decibels). For example, if two microphone-speaker systems that are configured to operate as microphones are provided with the same decibel level of sound pressure input, the microphone-speaker system that outputs the higher voltage in response to the sound pressure input may be determined to have a higher audio input sensitivity. If two microphone-speaker systems configured to operate as microphones are subjected to substantially the same decibel level of sound pressure input and output substantially the same voltage in response to the sound pressure input, then the two microphone-speaker systems may be determined to have substantially the same audio input sensitivity. In certain examples, the first microphone-speaker system 6 device and the second microphone-speaker system 8 may be substantially equivalent in maximum audio output power when configured to operate as speaker devices.

The first microphone-speaker system 6 may be provided on the first end 1, and the second microphone-speaker system 8 may be provided on the second end 2. In some examples, the mobile computing device 4 may determine an orientation of the mobile computing device. Responsive to and based on the determined orientation, the mobile computing device 4 may enable the first microphone-speaker system 6 to operate as a speaker device and may enable the second microphone-speaker system 8 to operate as a microphone. The enabling of the first microphone-speaker system may include allowing the first microphone-speaker system 6 to provide audio output and disallowing the mobile computing device to process audio input that is received by the first microphone-speaker system 6. The enabling of the second microphone-speaker system 8 to operate as a microphone may include allowing the mobile computing device to process audio input received by the second microphone-speaker system 8 disallowing the second microphone-speaker system 8 to provide audio output.

In certain examples, when the first microphone-speaker system 6 includes both a speaker device and a separate microphone, the enabling of the first microphone-speaker system 6 to operate as a speaker device may include allowing the speaker device of the first microphone-speaker system 6 to provide audio output and disallowing the mobile computing device to process audio input received from the microphone of the first microphone-speaker system 6 (e.g., disabling the microphone of the first microphone-speaker system 6). In such an example, the enabling of the second microphone-speaker system 8 to operate as a microphone may include allowing the microphone of the second microphone-speaker system 8 to receive audio input and disallowing the speaker of the second microphone-speaker system 8 to provide audio output (e.g., disabling the speaker of the second microphone-speaker system 8).

In certain examples, the mobile computing device 4 may determine a change in the orientation of the mobile computing device 4 (e.g., the change of orientation as illustrated in FIG. 1). Responsive to and based on the determined change in the orientation (e.g., change in physical orientation), the mobile computing device 4 may enable the second microphone-speaker system to operate as a speaker device, and may enable the first microphone-speaker system to operate as a microphone.

For instance, a user of computing device 4 may receive a phone call on mobile computing device 4. The user may answer the call and use the mobile computing device 4 as a telephone by placing one end of the mobile computing device 4 to the user's ear and the other end to the user's mouth. The mobile computing device 4 may determine the orientation of the mobile computing device 4 and may enable the first microphone-speaker system to operate as a speaker device and the second microphone-speaker system to operate as a microphone. During the telephone call, the user may change the orientation of the mobile computing device 4. For instance, the user may remove the mobile computing device 4 from the user's ear to look up a calendar entry on the mobile computing device 4. The user may then return the mobile computing device 4 to the user's mouth and ear for use as a telephone, but may change the orientation of the mobile computing device 4. In a similar example, a user may drop the mobile computing device 4 or set it down during the phone call. The user may pick up the mobile computing device 4 during the phone call and may place it to the user's mouth and ear in a different orientation. In such examples, the mobile computing device 4 may determine a change in the orientation of the mobile computing device 4. Responsive to and based on the determined change in the orientation, the mobile computing device 4 may enable the second microphone-speaker system to operate as a speaker device and may enable the first microphone-speaker system to operate as a microphone. Further details of one or more examples of the present disclosure are provided below.

Figure 2:
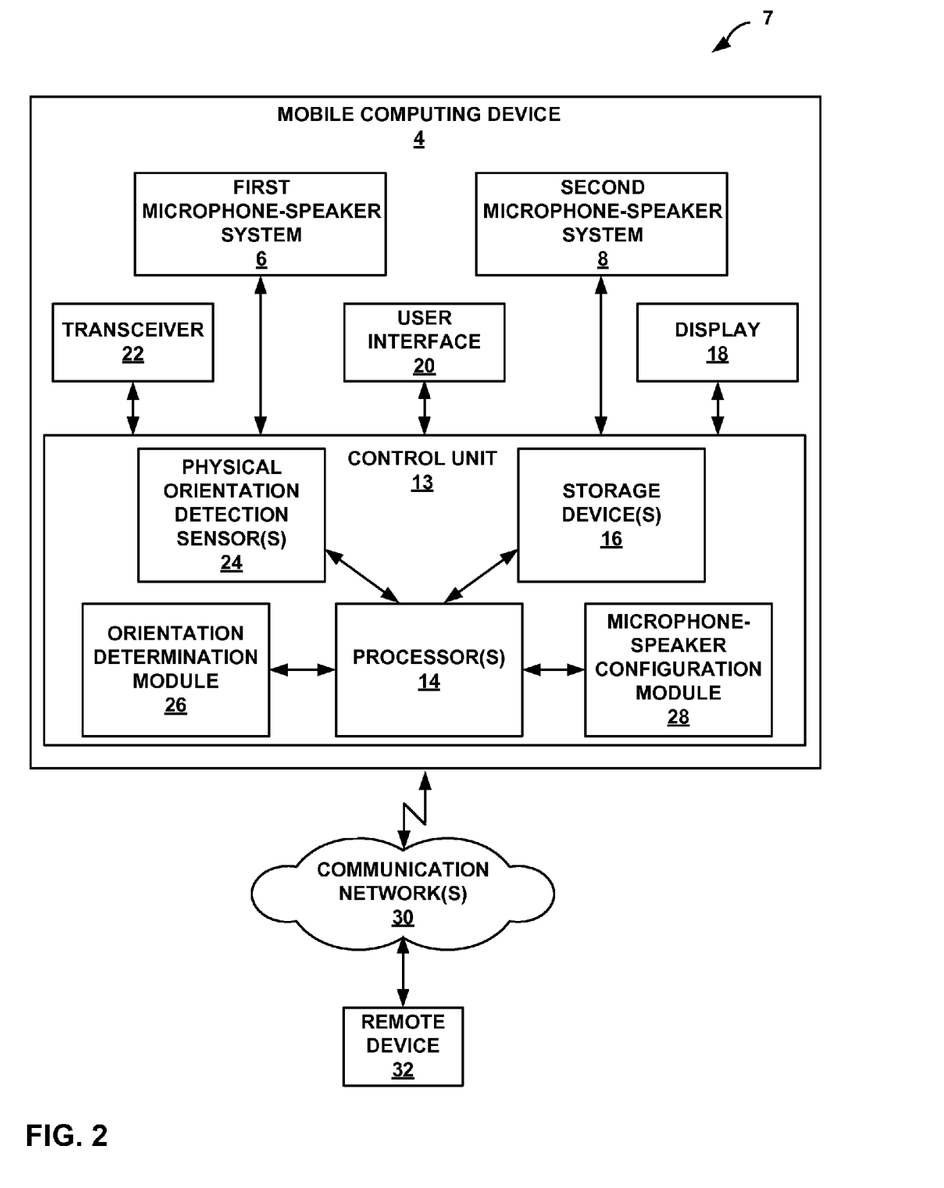
FIG. 2 is a block diagram illustrating an example communication system.

FIG. 2 is a block diagram illustrating an example communication system. As illustrated in FIG. 2, the communication system 7 may include mobile computing device 4, remote device 32, and one or more communication networks 30. Examples of the mobile computing device 4 and the remote device 32 may include, but are not limited to, portable or mobile devices such as cellular phones, personal digital assistants (PDAs), portable gaming devices, portable media players, tablet computers, and e-book readers.

The mobile computing device 4 and the remote device 32 may be the same or different types of devices. For example, the mobile computing device 4 and the remote device 32 may both be cellular phones. In another example, the mobile computing device 4 may be a cellular phone and the remote device 32 may be a PDA.

The mobile computing device 4 and the remote device 32 are coupled to one or more communication networks 30 via wired or wireless links or both. The one or more communication networks 30 may include a telephone network such as a cellular telephone network, a wide-area network such as the Internet, a local-area network (LAN), an enterprise network, or one or more other types of networks. The mobile computing device 4 and the remote device 32 may establish telephonic communications or transmit and receive data using the one or more communication networks 30.

As illustrated in FIG. 2, the mobile computing device 4 may include first microphone-speaker system 6, second microphone-speaker system 8, transceiver 22, user interface 20, display 18, and control unit 13. In some examples, the first microphone-speaker system 6 and the second microphone-speaker system 8 may each comprise one hardware device that can be enabled to operate as either a microphone or as a speaker device (e.g., depending upon the direction of current applied to the microphone-speaker system). In other examples, the first microphone-speaker system 6 and the second microphone-speaker system 8 may each include separate microphones and speaker devices (not shown). Control unit 13 may include one or more physical orientation detection sensor(s) 24, one or more storage device(s) 16, microphone-speaker configuration module 28, one or more processor(s) 14, and orientation determination module 26.

Although shown as separate components in FIG. 2, in some examples, the orientation determination module 26 and the microphone-speaker configuration module 28 may be part of the same module. In some examples, one or more of the orientation determination module 26, the microphone-speaker configuration module 28, and one or more processors 14 may be formed in a common hardware unit. In certain examples, one or more of the orientation determination module 26 and the microphone-speaker configuration module 28 may be software and/or firmware units that are executed on the one or more processors 14.

The mobile computing device 4 may include additional components not shown in FIG. 2 for clarity. For example, the mobile computing device 4 may include a battery to provide power to the components of the mobile computing device 4. Similarly, the components of the mobile computing device 4 shown in FIG. 2 may not be necessary in every example of the mobile computing device 4. For example, if the mobile computing device 4 comprises a portable media player such as a music player, the mobile computing device 4 may not include a display 18.

User interface 20 may allow a user of the mobile computing device 4 to interact with the mobile computing device 4. Examples of the user interface 20 may include, but are not limited to, a keypad embedded on the mobile computing device 4, a keyboard, such as a peripheral keyboard or a touch screen keyboard provided on display 18, a mouse, a roller ball, buttons, a touch screen, a microphone, a camera, or other devices that allow a user to interact with the mobile computing device 4.

Display 18 may be a liquid crystal display (LCD), e-ink, or other display. The display 18 may present the content of the mobile computing device 4 to a user. For example, the display 18 may present the output of applications executed on the mobile computing device 4 such as a web browser, or other functions that may need to be presented to a user. In some examples, the display 18 may present some or all of the functionality of the user interface 20. For example, the display 18 may be a touch screen that can allow a user to interact with the mobile computing device 4.

Transceiver 22 may be configured to transmit data to and receive data from the remote device 32 or one or more servers (not shown). The transceiver 22 may be configured to establish telephonic communications with the remote device 32. For example, a user may initiate a telephone call with the transceiver 22 to the remote device 32, or receive a telephone call with the transceiver 22 from the remote device 32. In some examples, transceiver 22 may be configured to establish voice communications with the remote device 32 using session initiation protocol (SIP) and/or voice over internet protocol (VoIP). For instance, in examples when the one or more communication networks 30 include a wide-area network such as the Internet, mobile computing device 4 and remote device 32 may initiate a voice connection over the Internet using SIP and may communicate using VoIP.

The transceiver 22 may support wireless or wired communication, and may include appropriate hardware and software to provide wireless or wired communication. For example, the transceiver 22 may include one or more of an antenna, modulators, demodulators, amplifiers, and other circuitry to effectuate communication between the mobile computing device 4, the remote device 32, or one or more servers.

One or more storage devices 16 may include any form of machine- or computer-readable media. For example, the one or more storage devices 16 may include any volatile, non-volatile, magnetic, optical, or electrical media, such as a hard drive, random access memory (RAM), read-only memory (ROM), non-volatile RAM (NVRAM), electrically-erasable programmable ROM (EEPROM), flash memory, or any other digital media.

The one or more storage devices 16 may, in some examples, be considered as a non-transitory storage medium. In certain examples, the one or more storage devices 16 may be considered as a tangible storage medium. The terms "non-transitory" and "tangible" may indicate that the storage medium is not embodied in a carrier wave or a propagated signal. However, the term "non-transitory" should not be interpreted to mean that the one or more storage devices 16 is non-movable and/or does not change over time. As one example, the one or more storage devices 16 may be removed from the mobile computing device 4, and moved to another device. As another example, one or more storage devices, substantially similar to the one or more storage devices 16, may be inserted into the mobile computing device 4. In certain examples, a non-transitory storage medium may store data that can, over time, change (e.g., in RAM).

In some examples, the one or more storage devices 16 may store one or more instructions that cause the one or more processors 14, the one or more orientation detection sensors 24, the orientation determination module 26, and/or the microphone-speaker configuration module 28 to perform various functions ascribed to the one or more processors 14, the one or more physical orientation detection sensors 24, the orientation determination module 26, and/or the microphone-speaker configuration module 28.

One or more processors 14 may include, in certain examples, any one or more of a microprocessor, a controller, a digital signal processor (DSP), an application specific integrated circuit (ASIC), a field-programmable gate array (FPGA), or equivalent discrete or integrated logic circuitry. For ease of description, aspects of this disclosure are described in the context of a single processor 14. However, it should be understood that aspects of this disclosure described with a single processor 14 may be implemented in one or more processors.

First microphone-speaker system 6 and second microphone-speaker system 8 may be enabled to accept audio input, such as from a user of the mobile computing device 4. In certain examples, the first microphone-speaker system 6 and the second microphone-speaker system 8 may each include separate microphones and speaker devices. For instance, first microphone-speaker system 6 may include both a first microphone and a first speaker device. Second microphone-speaker system 8 may include both a second microphone and a second speaker device. In some examples, the first microphone of the first microphone-speaker system 6 and the second microphone of the second microphone-speaker system 8 may be substantially equivalent in physical size. In certain examples, the first microphone of the first microphone-speaker system 6 and the second microphone of the second microphone-speaker system 8 may be substantially equivalent in audio input sensitivity.

First microphone-speaker system 6 and second microphone-speaker system 8 may each be enabled to operate as a speaker device to provide audio output. For instance, in examples where mobile computing device 4 is a cellular telephone, the first microphone-speaker system 6 or the second microphone-speaker system 8 may be used to provide the audio output of the telephonic communication. In examples when the first microphone-speaker system 6 and the second microphone-speaker system 8 each include separate microphones and speaker devices, the first microphone-speaker system 6 and the second microphone-speaker system 8 may be enabled to operate as a speaker device by allowing the speaker device of the microphone-speaker system to provide audio output and disallowing the microphone of the microphone-speaker system to receive audio input that is processed by the mobile computing device 4. In certain examples, the first speaker device of the first microphone-speaker system 6 and the second speaker device of the second microphone-speaker system may be substantially equivalent in physical size. In some examples, the first speaker device of the first microphone-speaker system 6 and the second speaker device of the second microphone-speaker system 8 may be substantially equivalent in maximum audio output power.

In some examples, the mobile computing device 4 may determine an orientation of the mobile computing device 4. In certain examples, the mobile computing device 4 may determine an orientation of the mobile computing device 4 using the one or more physical orientation detection sensors 24. Examples of the physical orientation detection sensors 24 may include, but are not limited to, accelerometers, gyroscopes, magnetometers, physical proximity sensors, and the like.

As one example, the one or more physical orientation detection sensors 24 may include an accelerometer. Physical orientation information may be obtained from the accelerometer. For example, the accelerometer may be used to detect the physical orientation of the accelerometer with respect to gravity. The physical orientation information obtained from the accelerometer may be used, such as by the orientation determination module 26, to determine the physical orientation of the mobile computing device 4. For example, the orientation determination module 26 may compare the detected physical orientation of the accelerometer with respect to gravity to a known orientation of the accelerometer with respect to the mobile computing device 4. As such, the orientation determination module 26 may determine the orientation of the mobile computing device 4. For example, the orientation determination module 26 may use the orientation information obtained from the accelerometer to determine the physical orientation of the mobile computing device 4 with respect to gravity.

In some examples, the orientation determination module 26 may use the determined physical orientation of the mobile computing device 4 with respect to gravity to determine which end of the mobile computing device 4 is closer to the ground (e.g., a height as measured from the earth to the mobile computing device). Such a determination may be useful for enabling the microphone-speaker systems for use of the mobile computing device 4 as a telephone.

For example, a user of the mobile computing device 4 may typically use the mobile computing device 4 as a telephone while the user is standing or seated in an upright position. As such, the user may typically hold one end of the mobile computing device 4 to the user's ear and the opposite end to the user's mouth. In such a configuration, with the user standing or seated in an upright position, the end of the mobile computing device 4 that is closer to the user's ear will typically be farther from the ground than the end that is closer to the user's mouth.

The mobile computing device 4 may, in some examples, enable the microphone-speaker system that is determined to be closer to the user's ear (e.g., the microphone-speaker system provided on the end of the device 4 that is determined to be farther from the ground) to operate as a speaker device. Further, the mobile computing device 4 may enable the microphone-speaker system that is determined to be closer to the user's mouth (e.g., the microphone-speaker system provided on the end of the device 4 that is determined to be closer to the ground) to operate as a microphone.

In examples where the end of the mobile computing device 4 that is closer to the user's ear is closer to the ground (e.g., a user is reclined or lying down), mobile computing device 4 may allow a user to manually select the configuration of the microphone and speaker systems. For instance, a user may manually configure, or "lock" the microphone-speaker systems (e.g., using user interface 20), such that the end that includes the microphone-speaker system that is closer to the ground (and closer to the user's ear in this example) is configured as a speaker device. Similarly, in such an example, the microphone-speaker system that is further from the ground (and closer to the user's mouth in this example) may be configured as a microphone.

In some examples, the one or more physical orientation detection sensors 24 may include a gyroscope. Physical orientation information may be obtained from the gyroscope. The physical orientation information obtained from the gyroscope may be used, such as by the orientation determination module 26, to determine the orientation of the mobile computing device 4. For example, the orientation determination module 26 may compare the physical orientation information obtained from the gyroscope to a known orientation of the gyroscope with respect to the mobile computing device 4 to determine the physical orientation of the mobile computing device 4.

The one or more physical orientation detection sensors 24 may include, in some examples, one or more physical proximity sensors able to detect the proximity of the sensor to nearby objects. For instance, a proximity sensor may be included on each end of the mobile computing device 4 (e.g., first end 1 and second end 2 of FIG. 1). The proximity sensors may be used to determine the proximity of each end of the mobile computing device 4 to the user's head. For instance, while using the mobile computing device 4 as a telephone, a user may typically hold one end of the mobile computing device 4 to the user's ear and the other end closer to the user's mouth. The end that is held closer to the user's ear may typically be held closer to the user's head than the end that is held closer to the user's mouth. The mobile computing device 4 may determine that the end that is determined to be closer to the user's head is closer to the user's ear while the other end is closer to the user's mouth. As such, the mobile computing device 4 may enable the microphone-speaker system provided on the end that is determined to be closer to the user's ear to operate as a speaker device. Similarly, the mobile computing device 4 may enable the microphone-speaker system provided on the end that is determined to be closer to the user's mouth to operate as a microphone.

In some examples, the one or more physical orientation detection sensors 24 may include a magnetometer. In some examples, a magnetometer is a sensor that may provide data that can be reduced to a vector pointing toward the Earth's magnetic north pole. The mobile computing device 4 may obtain orientation information with respect to the Earth's magnetic field from the magnetometer. Using the orientation information, orientation determination module 26 may determine the physical orientation of the mobile computing device 4 with respect to the Earth's magnetic field.

In certain examples, the mobile computing device 4 may determine an orientation of the mobile computing device 4 with respect to a user of the mobile computing device 4 using one or more detected voice volume levels. As one example, the mobile computing device 4 may determine an orientation of the mobile computing device 4 using detected voice volume levels from both the first microphone-speaker system 6 and the second microphone-speaker system 8. In such an example, the mobile computing device 4 may enable both the first microphone-speaker system 6 and the second microphone-speaker system 8 to operate as microphones, such as when the mobile computing device 4 is receiving a telephonic communication. The mobile computing device 4 may detect, with the first microphone-speaker system 6 enabled to operate as a microphone, a first voice volume level. Similarly, the mobile computing device 4 may detect, with the second microphone-speaker system enabled to operate as a microphone, a second voice volume level. The mobile computing device may compare the first voice volume and the second voice volume levels, such as by using the orientation determination module 26. The mobile computing device 4 may determine the orientation with respect to the user based on the comparison.

As an example, the mobile computing device 4 may use the comparison of the detected voice volume levels to determine the orientation of the mobile computing device with respect to the user's mouth and ear. In some examples, the microphone-speaker system that detects the greatest voice volume level may be determined to be the closest microphone to the user's mouth. As such, the mobile computing device may enable the microphone-speaker system that has detected the greatest voice volume level to operate as a microphone, and may enable the other microphone-speaker system to operate as a speaker device.

In certain examples, the mobile computing device 4 may use a detected voice volume level from just one microphone-speaker system. As one example, the mobile computing device 4 may detect a voice volume level from just one of first microphone-speaker system 6 or the second microphone-speaker system 8. The mobile computing device 4 may compare the detected voice volume level to a threshold value and may determine that the microphone-speaker system is the closest microphone to the user's mouth if the detected voice volume level exceeds the threshold value. The mobile computing device 4 may determine that the microphone-speaker system is not the closest microphone-speaker system to the user's mouth if the detected voice volume level does not exceed the threshold value. The mobile computing device may enable the microphone-speaker system that has been determined to be closest to the user's mouth to operate as a microphone. The mobile computing device may enable the microphone-speaker system that has not been determined to be closest to the user's mouth to operate as a speaker device.

In some examples, the mobile computing device 4 may determine an orientation of the mobile computing device 4 using the one or more physical orientation detection sensors 24 and one or more detected voice volume levels (e.g., from one or more of first microphone-speaker system 6 and second microphone-speaker system 8).

As an example, the mobile computing device 4 may detect, with the first microphone-speaker system 6 enabled to operate as a microphone, a first voice volume level. The mobile computing device 4 may detect, with the second microphone-speaker system 8 enabled to operate as a microphone, a second voice volume level. The mobile computing device 4 may compare the first voice volume level and the second voice volume level. In addition, the one or more physical orientation detection sensors 24 may include an accelerometer. The mobile computing device 4 may obtain physical orientation information from the accelerometer. For example, the mobile computing device 4 may obtain, using the accelerometer, physical orientation information of the accelerometer with respect to gravity. The mobile computing device 4 may determine the orientation of the mobile computing device 4 based on the comparison of the voice volume levels and the physical orientation information obtained from the accelerometer (e.g., the physical orientation of the accelerometer with respect to gravity).

As an example, the mobile computing device 4 may determine a physical orientation of the mobile computing device 4 based on the physical orientation information obtained from the accelerometer. The physical orientation may include the physical orientation of the mobile computing device 4 with respect to gravity, such as by comparing the physical orientation obtained from the accelerometer with respect to gravity to a known physical orientation of the accelerometer with respect to the mobile computing device 4 (e.g., using a known orientation with which the accelerometer has been affixed to the mobile computing device 4).

In an example, the orientation may include the orientation of the mobile computing device 4 relative to a user's ear and mouth. For example, the mobile computing device 4 may use the determined physical orientation of the mobile computing device 4 with respect to gravity to determine which end of the mobile computing device 4 is closer to the ground (e.g., as measured from the earth to the mobile computing device). The mobile computing device 4 may determine that the microphone-speaker system provided on the end of the device that is determined to be closer to the ground is closer to the user's mouth. Similarly, the mobile computing device 4 may determine that the microphone-speaker system provided on the end of the device that is determined to farther from the ground is closer to the user's ear.

As an example, the mobile computing device 4 may determine an orientation of the mobile computing device 4 with respect to a user of mobile computing device 4 based on the comparison of the first voice volume level and the second voice volume level. The orientation may, in some examples, include the orientation of the mobile computing device 4 relative to the user's ear and mouth, such as by determining that the end of the device that includes the microphone-speaker system that detected the greatest voice volume level is closest to the user's mouth and the end that includes the microphone-speaker system that detected a lower voice volume level is closer to the user's ear.

The mobile computing device 4 may determine an orientation of the mobile computing device 4 based on a comparison of the physical orientation to the orientation determined based on the comparison of the voice volume levels. For instance, referring to the example of FIG. 1, both the physical orientation and the orientation determined based on the comparison of the voice volume levels may indicate that the first end 1 is closer to the user's ear and the second end 2 is closer to the user's mouth. As such, the mobile computing device 4 may determine that the first end 1 is closer to the user's ear and the second end 2 is closer to the user's mouth.

In another example, the physical orientation and orientation determined based on the comparison of the voice volume levels may indicate different orientations of the mobile computing device 4 relative to the user's mouth and ear. For example, the physical orientation, based on the physical orientation information obtained from the accelerometer, may indicate that the first end 1 is closer to the user's ear and the second end 2 is closer to the user's mouth. In contrast, the orientation determined based on the comparison of the voice volume levels may indicate that the second end 2 is closer to the user's ear and the first end 1 is closer to the user's mouth. In such an example, the mobile computing device 4 may determine the orientation of the mobile computing device 4 using the comparison of the physical orientation and the orientation determined based on the comparison of the voice volume levels.

For instance, the mobile computing device 4 may determine that the second end 2 is closer to the user's ear and the first end 1 is closer to the user's mouth (e.g., the determination based upon the comparison of the voice volume levels) because the determination based upon the physical orientation information obtained from the accelerometer may be considered less reliable in this instance. For example, the physical orientation that was determined based on the accelerometer may have been determined based upon a determination that the first end 1 is only slightly farther from the ground than the second end 2. Such detection may indicate that the mobile computing device 4 is essentially in a horizontal orientation and that the user may, for example, be lying down while using the device. In such case, the determined orientation based on the comparison of the voice volume levels may be determined to be more reliable than the determined orientation based on the physical orientation information obtained from the accelerometer.

In some examples, the one or more physical orientation detection sensors 24 may include a gyroscope. The mobile computing device 4 may obtain physical orientation information from the gyroscope, and may determine the orientation of the mobile computing device 4 based on the physical orientation information obtained from the gyroscope and a comparison of a first voice volume level to a second voice volume level. For instance, the mobile computing device 4 may determine a physical orientation of the mobile computing device 4 based on the physical orientation information obtained from the gyroscope. The mobile computing device 4 may determine an orientation of the mobile computing device with respect to the user based on the comparison of the first voice volume level and the second voice volume level. The mobile computing device 4 may compare the physical orientation and the orientation determined based on the comparison of the voice volume levels, and may determine the physical orientation of the mobile computing device 4 based on the comparison of the physical orientation and the orientation determined based on the comparison of the voice volume levels.

In certain examples, as in the example of FIG. 2, the mobile computing device 4 may include a microphone-speaker configuration module 28. The microphone-speaker configuration module 28 may be configured to enable each microphone-speaker system (e.g., first microphone-speaker system 6 and second microphone-speaker system 8) to operate as either a microphone or as a speaker device. In an example, the microphone-speaker configuration module 28 may be configured to enable the microphone-speaker systems to operate as either a microphone or as a speaker device responsive to and based on the determined orientation.

As an example, the enabling of a microphone-speaker system to operate as a speaker device may include allowing the microphone-speaker system to provide audio output and disallowing the microphone-speaker system to receive audio input. The enabling of a microphone-speaker system to operate as a microphone may include allowing the microphone-speaker system to receive audio input and disallowing the microphone-speaker system to provide audio output. In some examples, when the microphone-speaker system includes both a microphone and a speaker device (e.g., separate hardware devices), enabling the microphone-speaker system to operate as a speaker device may include allowing the speaker device of the microphone-speaker system to provide audio output and disallowing the mobile computing device 4 to process audio input received from the microphone of the microphone-speaker system (e.g., disabling the microphone of the microphone-speaker system). In such examples, enabling the microphone-speaker system to operate as a microphone may include allowing the mobile computing device 4 to process audio input received from the microphone of the microphone-speaker system and disallowing the speaker device of the microphone-speaker system to provide audio output (e.g., disabling the speaker device of the microphone-speaker system).

Figure 3:
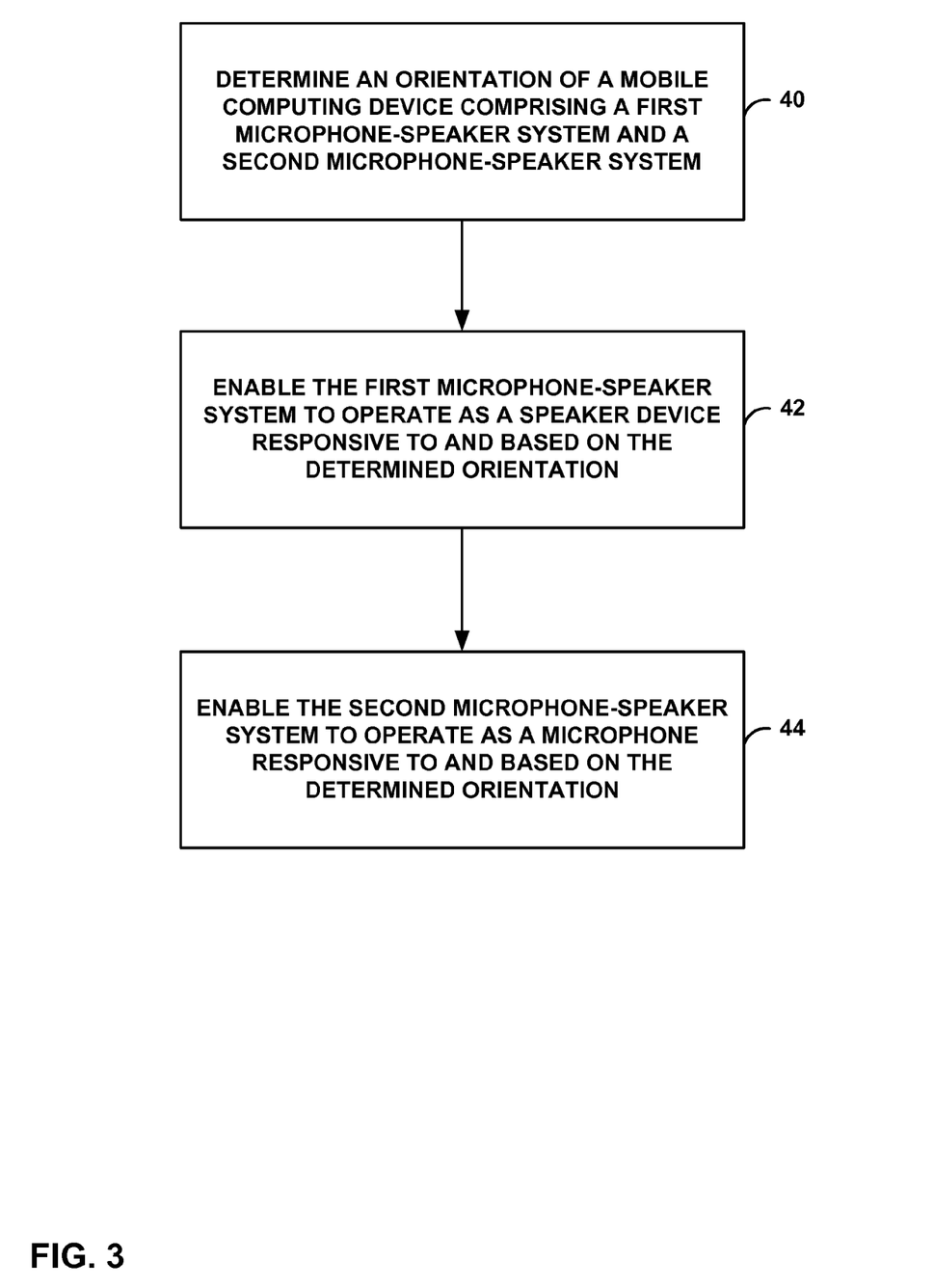
FIGS. 3 and 4 are flow diagrams illustrating an example operation of a mobile computing device.

FIG. 3 is a flow diagram illustrating an example operation of a mobile computing device. An orientation of a mobile computing device comprising a first microphone-speaker system and a second microphone-speaker system may be determined (40). For example, the orientation determination module 26 of the mobile computing device 4 may determine an orientation of the mobile computing device 4 using information obtained from the one or more physical orientation detection sensors 24 (e.g., accelerometers, gyroscopes, and the like) and/or one or more of the first and second microphone-speaker systems.

The first microphone-speaker system may be enabled to operate as a speaker device, responsive to and based on the determined orientation (42) (e.g., by microphone-speaker configuration module 28 of FIG. 2). The second microphone-speaker system may be enabled to operate as a microphone, responsive to and based on the determined orientation (44) (e.g., by microphone-speaker configuration module 28 of FIG. 2).

In some examples, determining the orientation of the mobile computing device (e.g., by orientation determination module 26 of FIG. 2) may include enabling the first microphone-speaker system to operate as a microphone (e.g., first microphone-speaker system 6 of FIG. 2) and enabling the second microphone-speaker system to operate as a microphone (e.g., second microphone-speaker system 8 of FIG. 2), detecting a first voice volume level with the first microphone-speaker system enabled to operate as a microphone, detecting a second voice volume level with the second microphone-speaker system enabled to operate as a microphone, comparing the first voice volume level and the second voice volume level, and determining the orientation of the mobile computing device with respect to the user based on the comparison (e.g., by orientation determination module 26 of FIG. 2).

In certain examples, determining the orientation of the mobile computing device may include determining the orientation relative to a location of a user's mouth and ear. For instance, determining the orientation relative to the location of the user's mouth and ear may include determining the orientation of the second microphone-speaker system (e.g., second microphone-speaker system 8 of FIG. 2) relative to the user's mouth and determining the orientation of the first microphone-speaker system (e.g., first microphone-speaker system 6 of FIG. 2) relative to the user's ear. Similarly, determining the orientation relative to the location of the user's mouth and ear may include determining the orientation of the second microphone-speaker system (e.g., second microphone-speaker system 8 of FIG. 2) relative to the user's ear and determining the orientation of the first microphone-speaker system (e.g., first microphone-speaker system 6 of FIG. 2) relative to the user's mouth.

In some examples, determining the orientation of the mobile computing device may include enabling the first microphone-speaker system to operate as a microphone, enabling the second microphone-speaker system to operate as a microphone, detecting a first voice volume level with the first microphone-speaker system enabled to operate as a microphone, detecting a second voice volume level with the second microphone-speaker system enabled to operate as a microphone, comparing the first voice volume level and the second voice volume level, obtaining physical orientation information from an accelerometer of the mobile computing device (e.g., using the one or more physical orientation detection sensors 24 of FIG. 2), and determining an orientation of the mobile computing device based on the comparison and the physical orientation information obtained from the accelerometer (e.g., by orientation determination module 26 of FIG. 2).

In certain examples, determining the orientation of the mobile computing device based on the comparison of the voice volume levels and the physical orientation information obtained from the accelerometer may include determining a physical orientation of the mobile computing device based on the physical orientation information obtained from the accelerometer, determining an orientation of the mobile computing device with respect to the user based on the comparison of the first voice volume level and the second voice volume level, comparing the physical orientation and the orientation determined based on the comparison of the voice volume levels, and determining the physical orientation of the mobile computing device based on the comparison of the physical orientation and the orientation determined based on the comparison of the voice volume levels (e.g., by orientation determination module 26 of FIG. 2).

In some examples, determining the orientation of the mobile computing device may include obtaining physical orientation information from a gyroscope of the mobile computing device (e.g., one or more physical orientation detection sensors 24 of FIG. 2), and determining the physical orientation of the mobile computing device using the physical orientation information obtained from the gyroscope.

In certain examples, determining the orientation of the mobile communication device may include enabling the first microphone-speaker system to operate as a microphone, enabling the second microphone-speaker system to operate as a microphone, detecting a first voice volume level with the first microphone-speaker system enabled to operate as a microphone, detecting a second voice volume level with the second microphone-speaker system enabled to operate as a microphone, comparing the first voice volume level and the second voice volume level, obtaining physical orientation information from the gyroscope of the mobile computing device, and determining the orientation of the mobile computing device based on the comparison and the physical orientation information obtained from the gyroscope.

In some examples, determining the orientation of the mobile computing device based on the comparison and the physical orientation information obtained from the gyroscope may include determining a first orientation of the mobile computing device based on the physical orientation information obtained from the gyroscope, determining a second orientation of the mobile computing device with respect to the user based on the comparison of the first voice volume level and the second voice volume level, comparing the first orientation and the second orientation, and determining the orientation of the mobile computing device based on the comparison of the first orientation and the second orientation.

In certain examples, when the microphone-speaker systems include both a microphone and a physically separate speaker device (e.g., separate hardware devices), the first speaker of the first microphone-speaker system and the second speaker of the second microphone-speaker system may be substantially equivalent in physical size, maximum audio output power, or both. In some examples, the first microphone of the first microphone-speaker system and the second microphone of the second microphone-speaker system may be substantially equivalent in physical size, audio input sensitivity, or both.

Figure 4:
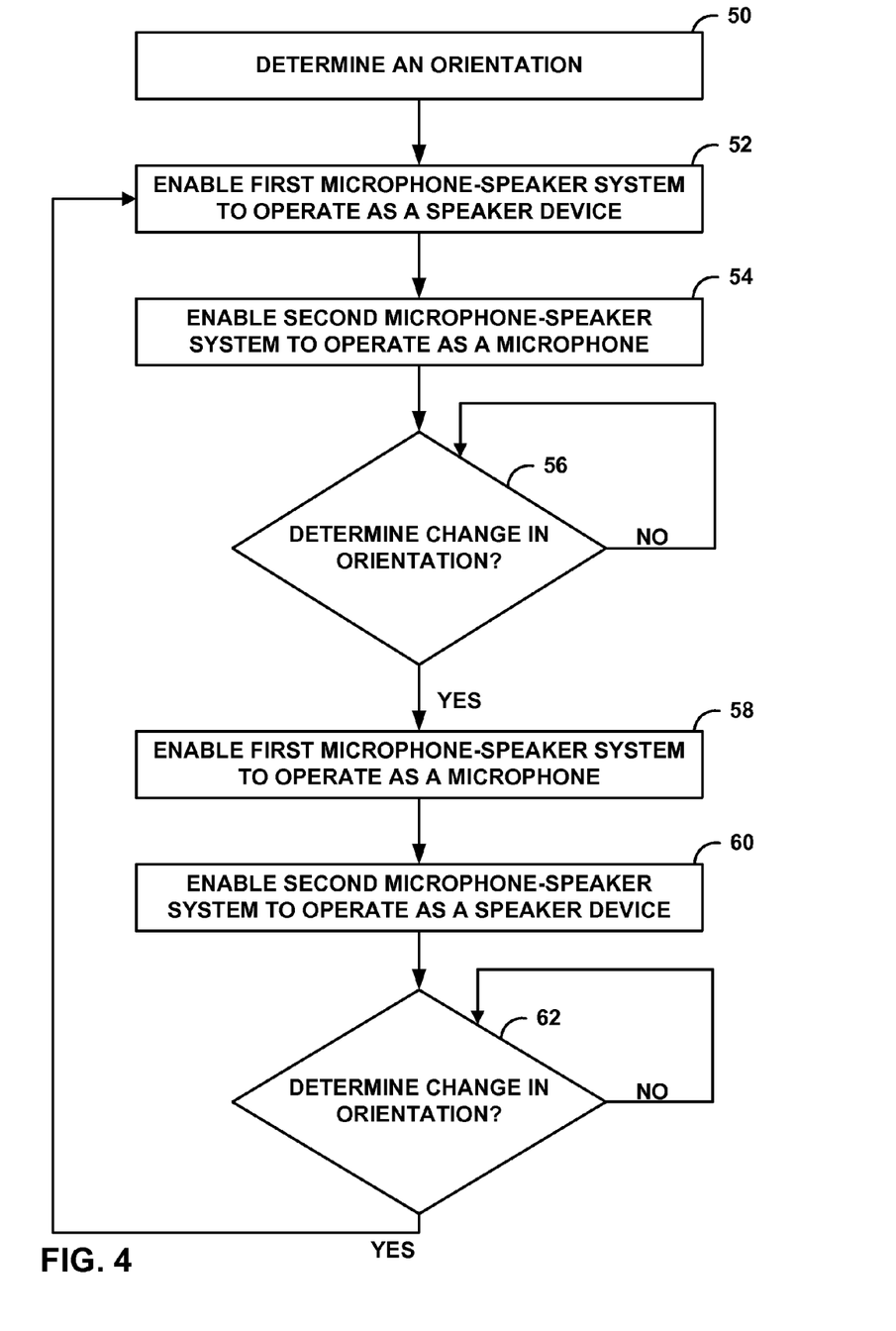

FIG. 4 is a flow diagram illustrating an example operation of a mobile computing device. An orientation of a mobile computing device may be determined (50). A first microphone-speaker system of the mobile computing device (e.g., first microphone-speaker system 6 of FIG. 2) may be enabled to operate as a speaker device, responsive to and based on the determined orientation (52). A second microphone-speaker system of the mobile computing device (e.g., second microphone-speaker system 8 of FIG. 2) may enabled to operate as a microphone, responsive to and based on the determined orientation (54). A change in the orientation of the mobile computing device may be determined (56). If no change in the orientation of the mobile computing device is determined ("NO" branch of 56), the first microphone-speaker system may continue to be enabled to operate as a speaker device. If, however, a change in the orientation of the mobile computing device is determined ("YES" branch of 56), the first microphone-speaker system may be enabled to operate as a microphone responsive to and based on the determined change in the orientation (58).

The second microphone-speaker system may be enabled to operate as a speaker device responsive to and based on the determined change in the orientation (60). A subsequent change in the orientation may be determined (62). If no change in the orientation of the mobile computing device is determined ("NO" branch of 62), the first microphone-speaker system may continue to be enabled to operate as a microphone and the second microphone-speaker system may continue to be enabled to operate as a speaker device. If, however, a change in the orientation of the mobile computing device is determined ("YES" branch of 62), the first microphone-speaker system may be enabled to operate as a speaker device responsive to and based on the determined change in the orientation.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A method comprising:
   determining a first orientation of a mobile computing device, wherein the mobile computing device comprises a first microphone-speaker system and a second microphone-speaker system that each provide microphone and speaker capabilities, wherein determining the first orientation of the mobile computing device comprises:
   obtaining physical orientation information from a physical orientation detection sensor of the mobile computing device;
   determining a physical orientation of the mobile computing device based on the physical orientation information obtained from the physical orientation detection sensor;
   enabling the first microphone-speaker system to operate as a microphone, wherein enabling the first microphone-speaker system to operate as a microphone allows the mobile computing device to process audio input received from the first microphone-speaker system, and disallows the first microphone-speaker system to provide audio output;
   enabling the second microphone-speaker system to operate as a microphone, wherein enabling the second microphone-speaker system to operate as a microphone allows the mobile computing device to process audio input received from the second microphone-speaker system, and disallows the second microphone-speaker system to provide audio output;
   detecting, by the first microphone-speaker system enabled to operate as a microphone, a first voice volume level;
   detecting, by the second microphone-speaker system enabled to operate as a microphone, a second voice volume level;
   comparing the first voice volume level and the second voice volume level;
   determining an orientation of the mobile computing device with respect to a user based on the comparison of the first voice volume level and the second voice volume level;
   determining, based on the physical orientation information obtained from the physical orientation detection sensor, that the determined physical orientation of the mobile computing device is less reliable than the determined orientation of the mobile computing device with respect to the user; and determining the first orientation of the mobile computing device based on the determined orientation of the mobile computing device with respect to the user; and enabling, by the mobile computing device, the first microphone-speaker system to operate as a speaker device responsive to and based on the determined first orientation, wherein enabling the first microphone-speaker system to operate as a speaker device allows the first microphone-speaker system to provide audio output and disallows the mobile computing device to process audio input received from the first microphone-speaker system.

2. The method of claim 1, further comprising:

determining, by the mobile computing device, a change in the first orientation of the mobile computing device;

enabling, by the mobile computing device, the second microphone-speaker system to operate as a speaker device responsive to and based on the determined change in the first orientation; and enabling, by the mobile computing device, the first microphone-speaker system to operate as a microphone responsive to and based on the determined change in the first orientation.

3. The method of claim 1, wherein the first microphone-speaker system comprises a first microphone and a first speaker device, the first microphone and the first speaker device comprising physically distinct hardware components, and wherein the second microphone-speaker system comprises a second microphone and a second speaker device, the second microphone and the second speaker device comprising physically distinct hardware components.

4. The method of claim 3, wherein enabling the first microphone-speaker system to operate as a speaker device comprises allowing the first speaker device of the first microphone-speaker system to provide audio output and disallowing the mobile computing device to process audio input received from the first microphone of the first microphone-speaker system; and wherein enabling the second microphone-speaker system to operate as a microphone comprises allowing the mobile computing device to process audio input received from the second microphone of the second microphone-speaker system and disallowing the second speaker device of the second microphone-speaker system to provide audio output.

5. The method of claim 3, wherein the first speaker of the first microphone-speaker system and the second speaker of the second microphone-speaker system are substantially equivalent in physical size.

6. The method of claim 3, wherein the first microphone of the first microphone-speaker system and the second microphone of the second microphone-speaker system are substantially equivalent in physical size.

7. The method of claim 3, wherein the first speaker of the first microphone-speaker system and the second speaker of the second microphone-speaker system are substantially equivalent in maximum audio output power.

8. The method of claim 3, wherein the first microphone of the first microphone-speaker system and the second microphone of the second microphone-speaker system are substantially equivalent in audio input sensitivity.

9. The method of claim 1, wherein the first microphone-speaker system comprises one hardware device, and wherein the second microphone-speaker system comprises one hardware device.

10. The method of claim 1, wherein the mobile computing device comprises a first end and a second end substantially opposite the first end, wherein the first microphone-speaker system is included on the first end of the mobile computing device, and wherein the second microphone-speaker system is included on the second end of the mobile computing device.

11. The method of claim 10, wherein determining that the determined physical orientation of the mobile computing device is less reliable than the determined orientation of the mobile computing device with respect to the user comprises determining that the physical orientation information obtained from the physical orientation detection sensor indicates that the first end of the mobile computing device and the second end of the mobile computing device are substantially horizontal with respect to ground.

12. The method of claim 1, wherein the physical orientation detection sensor comprises an accelerometer of the mobile computing device.

13. The method of claim 1, wherein the physical orientation detection sensor comprises a gyroscope of the mobile computing device.

14. The method of claim 1, wherein the first voice volume level is greater than the second voice volume level.

15. The method of claim 1, wherein determining the first orientation comprises determining the first orientation relative to a location of a user's mouth and ear.

16. The method of claim 15, wherein determining the first orientation relative to the location of the user's mouth and ear comprises determining the orientation of the first microphone-speaker system relative to the user's ear and determining the orientation of the second microphone-speaker system relative to the user's mouth.

17. A tangible computer-readable storage medium comprising instructions that, when executed, cause one or more processors of a mobile computing device to perform operations comprising:

determining a first orientation of the mobile computing device, wherein the mobile computing device comprises a first microphone-speaker system and a second microphone-speaker system that each provide microphone and speaker capabilities, wherein determining the first orientation of the mobile computing device comprises:

obtaining physical orientation information from a physical orientation detection sensor of the mobile computing device;

determining a physical orientation of the mobile computing device based on the physical orientation information obtained from the physical orientation detection sensor;

enabling the first microphone-speaker system to operate as a microphone, wherein enabling the first microphone-speaker system to operate as a microphone allows the mobile computing device to process audio input received from the first microphone-speaker system, and disallows the first microphone-speaker system to provide audio output;

and enabling the second microphone-speaker system to operate as a microphone, wherein enabling the second microphone-speaker system to operate as a microphone allows the mobile computing device to process audio input received from the second microphone-speaker system, and disallows the second microphone-speaker system to provide audio output;

detecting, by the first microphone-speaker system enabled to operate as a microphone, a first voice volume level;

detecting, by the second microphone-speaker system enabled to operate as a microphone, a second voice volume level;

comparing the first voice volume level and the second voice volume level;

determining an orientation of the mobile computing device with respect to a user based on the comparison of the first voice volume level and the second voice volume level;

determining, based on the physical orientation information obtained from the physical orientation detection sensor, that the determined physical orientation of the mobile computing device is less reliable than the determined orientation of the mobile computing device with respect to the user; and determining the first orientation of the mobile computing device based on the determined orientation of the mobile computing device with respect to the user; and enabling the first microphone-speaker system to operate as a speaker device responsive to and based on the determined first orientation, wherein the instructions to enable the first microphone-speaker system to operate as a speaker device allow the first microphone-speaker system to provide audio output and disallow the mobile computing device to process audio input received from the first microphone-speaker system.

18. A mobile computing device, comprising:

a first microphone-speaker system and a second microphone-speaker system that can each provide microphone and speaker capabilities; and at least one processor, wherein the at least one processor is configured to:

determine a first orientation of the mobile computing device, wherein determining the first orientation of the mobile computing device comprises:

obtaining physical orientation information from a physical orientation detection sensor of the mobile computing device;

determining a physical orientation of the mobile computing device based on the physical orientation information obtained from the physical orientation detection sensor;

enabling the first microphone-speaker system to operate as a microphone, wherein enabling the first microphone-speaker system to operate as a microphone allows the mobile computing device to process audio input received from the first microphone-speaker system, and disallows the first microphone-speaker system to provide audio output;

enabling the second microphone-speaker system to operate as a microphone, wherein enabling the second microphone-speaker system to operate as a microphone allows the mobile computing device to process audio input received from the second microphone-speaker system, and disallows the second microphone-speaker system to provide audio output;

detecting, by the first microphone-speaker system enabled to operate as a microphone, a first voice volume level;

detecting, by the second microphone-speaker system enabled to operate as a microphone, a second voice volume level;

comparing the first voice volume level and the second voice volume level;

determining an orientation of the mobile computing device with respect to a user based on the comparison of the first voice volume level and the second voice volume level;

determining, based on the physical orientation information obtained from the physical orientation detection sensor, that the determined physical orientation of the mobile computing device is less reliable than the determined orientation of the mobile computing device with respect to the user; and determining the first orientation of the mobile computing device based on the determined orientation of the mobile computing device with respect to the user; and enable the first microphone-speaker system to operate as a speaker device responsive to and based on the determined first orientation, wherein enabling the first microphone-speaker system to operate as a speaker device allows the first microphone-speaker system to provide audio output and disallows the mobile computing device to process audio input received from the first microphone-speaker system.

* * * * *